United States Patent
Stewart

(10) Patent No.: US 7,408,282 B2
(45) Date of Patent: Aug. 5, 2008

(54) END SHIELDS AND STATORS AND RELATED METHODS OF ASSEMBLY

(75) Inventor: William P. Stewart, Saint Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/958,197

(22) Filed: Oct. 4, 2004

(65) Prior Publication Data

US 2006/0071574 A1    Apr. 6, 2006

(51) Int. Cl.
*H02K 1/18* (2006.01)
(52) U.S. Cl. ..................................... 310/218; 310/259
(58) Field of Classification Search ......... 310/216–218, 310/254, 258, 259
See application file for complete search history.

(56) References Cited

U.S. PATENT DOCUMENTS

| | | | | |
|---|---|---|---|---|
| 529,437 | A | * | 11/1894 | Wood .......................... 310/265 |
| 2,072,769 | A | * | 3/1937 | Reeder ........................ 310/258 |
| 2,479,330 | A | * | 8/1949 | Fagley ........................ 336/100 |
| 3,050,832 | A | | 8/1962 | Scheldorf |
| 3,492,517 | A | | 1/1970 | Kuraisi |
| 3,531,702 | A | | 9/1970 | Hill |
| 3,845,334 | A | | 10/1974 | Harada et al. |
| 3,946,260 | A | | 3/1976 | Fressolini et al. |
| 3,990,141 | A | | 11/1976 | Stark |
| 4,253,031 | A | | 2/1981 | Frister |
| 4,603,273 | A | | 7/1986 | McDonald |
| 4,617,726 | A | | 10/1986 | Denk |
| 4,758,755 | A | | 7/1988 | Sherman et al. |
| 4,801,831 | A | * | 1/1989 | Lewis ........................... 310/91 |
| 4,850,193 | A | | 7/1989 | Kawamura |
| 4,888,510 | A | | 12/1989 | Hunt |
| 4,908,922 | A | | 3/1990 | Abe |
| 4,982,125 | A | | 1/1991 | Shirakawa |
| 5,006,744 | A | | 4/1991 | Archer et al. |
| 5,059,042 | A | | 10/1991 | Grierson |
| 5,128,576 | A | * | 7/1992 | Obradovic .................. 310/217 |
| 5,199,171 | A | | 4/1993 | Umezawa et al. |

(Continued)

FOREIGN PATENT DOCUMENTS

DE        19935723        10/2000

(Continued)

OTHER PUBLICATIONS

Pending U.S. Appl. No. 10/958,196 for Apparatus and Methods of Retaining a Stator Within a Housing of an Electric Machine, filed Oct. 4, 2004, Stewart.

(Continued)

*Primary Examiner*—Dang D Le
(74) *Attorney, Agent, or Firm*—Harness, Dickey & Pierce, P.L.C.

(57) ABSTRACT

An electric machine includes an end shield and a stator. The stator may be a segmented stator or a non-segmented stator. At least one track is defined by either the stator or the end shield, and at least one pin is defined by the other one of the stator and the end shield. The stator is positioned on the end shield such that the pin is slidably received within the track.

10 Claims, 5 Drawing Sheets

U.S. PATENT DOCUMENTS

| | | | |
|---|---|---|---|
| 5,638,796 | A | 6/1997 | Adams, III et al. |
| 5,926,663 | A * | 7/1999 | Suzuki ........................ 396/449 |
| 5,973,428 | A | 10/1999 | Zakrocki et al. |
| 6,065,760 | A | 5/2000 | Weygandt |
| 6,145,314 | A * | 11/2000 | Woollenweber et al. ....... 60/607 |
| 6,173,996 | B1 | 1/2001 | Derakhshan et al. |
| 6,212,753 | B1 | 4/2001 | Derakhshan et al. |
| 6,271,609 | B1 | 8/2001 | Hollenbeck et al. |
| 6,400,059 | B1 * | 6/2002 | Hsu ........................... 310/254 |
| 6,404,095 | B1 | 6/2002 | Hsu |
| 6,448,686 | B1 * | 9/2002 | Dawson et al. ............... 310/254 |
| 6,487,769 | B2 | 12/2002 | Ketterer et al. |
| 6,515,397 | B1 * | 2/2003 | Schmid ....................... 310/217 |
| 6,572,283 | B1 * | 6/2003 | Imano ......................... 396/463 |
| 6,583,530 | B2 * | 6/2003 | Hsu ........................... 310/254 |
| 6,651,633 | B1 | 11/2003 | Jones |
| 6,713,916 | B1 | 3/2004 | Williams et al. |
| 6,848,165 | B1 * | 2/2005 | Furuse ........................ 29/596 |
| 6,941,644 | B2 | 9/2005 | Shteynberg et al. |
| D515,521 | S | 2/2006 | Stewart et al. |
| 7,036,206 | B2 | 5/2006 | Worden et al. |
| 2002/0011755 | A1 | 1/2002 | Shteynberg et al. |
| 2003/0067243 | A1 | 4/2003 | Hollenbeck et al. |
| 2004/0183388 | A1 | 9/2004 | Rittmeyer |
| 2006/0070229 | A1 | 4/2006 | Stewart et al. |
| 2006/0071569 | A1 | 4/2006 | Stewart et al. |
| 2006/0072288 | A1 | 4/2006 | Stewart et al. |
| 2006/0073042 | A1 | 4/2006 | Stewart et al. |

FOREIGN PATENT DOCUMENTS

| | | |
|---|---|---|
| EP | 1 367 699 A2 | 3/2003 |
| WO | WO 99/33158 | 7/1999 |
| WO | WO 03/021746 A1 | 3/2003 |
| WO | WO 03/096515 A1 | 11/2003 |
| WO | WO 2004/004098 A1 | 1/2004 |
| WO | WO 2005/085611 A1 | 9/2005 |

OTHER PUBLICATIONS

Pending U.S. Appl. No. 10/958,198 for Electric Machines and Methods Related to Assembling Electric Machines, filed Oct. 4, 2004, Stewart et al.

Pending U.S. Appl. No. 10/958,213 for Electric Machines and Methods Related to Assembling Electric Machines, filed Oct. 4, 2004, Stewart et al.

Design of a High Speed Switched Reluctance Machine for Automotive Turbo-Generator Applications; S.D. Calverly, et al; University of Sheffield; SAE Technical Paper Series 1999-01-2933; Aug. 17-19, 1999, pp. 1-10.

Visteon Partners in Technology; European Automotive Design; Oct. 2002; pp. 30-43.

Aerodynamic Losses in Switched Reluctance Machines; S.D. Calverley, et al; IEE Proc.-Electr. Power Appl., vol. 147, No. 6, Nov. 2000; pp. 443-448.

* cited by examiner

END SHIELDS AND STATORS AND RELATED METHODS OF ASSEMBLY

FIELD

The present invention generally relates to electric machines, and more particularly (but not exclusively) to end shields and stators having integral assembly features and related methods for assembling stators on end shields.

BACKGROUND

Secondary fixtures, and/or retaining bands are commonly used to position and control individual stator segments during both assembly of the stator segments and their insertion into the housing. For example, one process includes individually positioning stator segments against a center mandrel, and then pressing a secondary band over the segments. The assembled segmented stator can then be inserted into a housing. But only after the segmented stator has been fully assembled and then inserted into the housing is the end shield ultimately inserted into the housing as a separate component in a discrete operation.

SUMMARY

In one implementation, an electric machine includes an end shield and a stator. The stator may be a segmented stator or a non-segmented stator. At least one track is defined by either the stator or the end shield, and at least one pin is defined by the other one of the stator and the end shield. The stator is positioned on the end shield such that the pin is slidably received within the track.

In another implementation, an electric machine includes a segmented stator having a plurality of stator segments. Each stator segment defines at least one track. The electric machine also includes an end shield defining a plurality of pins. The stator segments are positioned on the end shield such that each pin is received within a different track.

In another aspect, the present invention provides a method of engaging a stator with an end shield of an electric machine. The stator may be a segmented stator or a non-segmented stator. In one implementation, the method generally includes positioning at least one pin defined by either the stator or the end shield within at least one track defined by the other one of the stator and the end shield.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EXEMPLARY EMBODIMENTS

The following description of the exemplary embodiments is merely exemplary in nature and is in no way intended to limit the invention, its application, or uses.

An electric machine according to one aspect of the invention includes an end shield and a stator. The stator may be a circumferentially segmented stator including a plurality of stator segments or teeth, or the stator may a non-segmented stator. At least one track is defined by either the stator or the end shield, and at least one pin is defined by the other one of the stator and the end shield. The stator is positioned on the end shield such that the pin is slidably received within the track. In yet other aspects, the invention provides end shields, stators, stator segments, and combinations thereof that include at least one of such pins or tracks. Further aspects of the invention include electric machines, electric motors, electric superchargers, vehicles (e.g., automobiles, etc.), switched reluctance motors, brushless permanent magnet (BPM) motors, induction motors, and electric generators that include stators, stator segments, and/or end shields of the present invention.

Accordingly, various implementations include stator segments that can be assembled directly on an end shield without the need for supplemental restraints, secondary fixtures, or retaining bands. Various implementations can also include positioning an end shield and stator (whether segmented or non-segmented) together within the housing rather than inserting the end shield into the housing as a separate component in a discrete operation. Therefore, implementing one or more aspects of the invention allows assembly to be streamlined by reducing the number of discrete operations required for assembling the electric machine.

Figure 6:
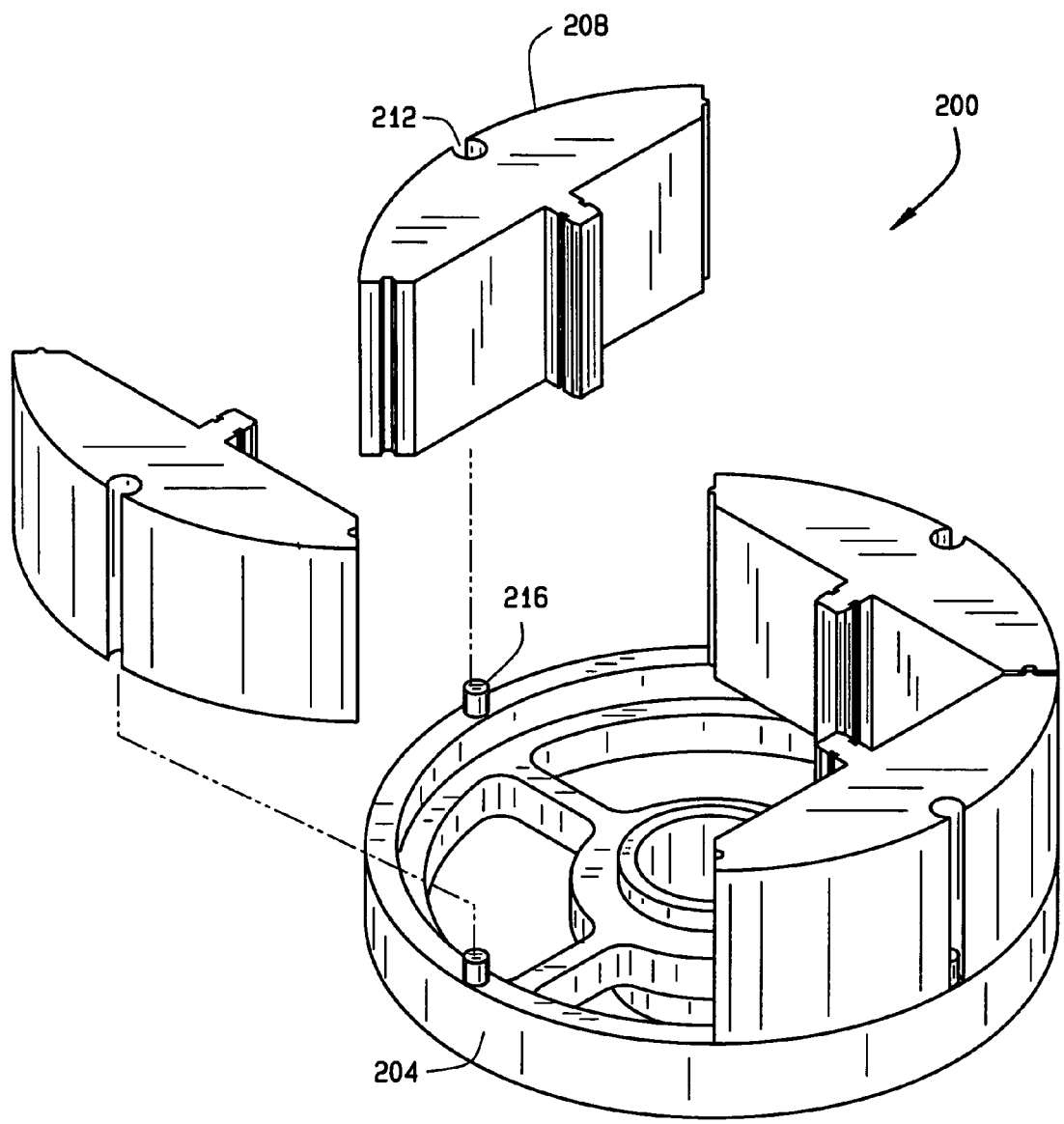
FIG. 6 is an exploded perspective view of an end shield and unwound segmented stator according to another embodiment of the invention.

FIGS. 1 through 5 illustrate an exemplary segmented stator 100 and end shield 104 in accordance with the principles of this invention. As shown, the stator 100 includes six stator segments or teeth 108. Alternative embodiments, however, can include segmented stators having more or less than six stator segments depending on the particular application. For example, FIG. 6 illustrates an exemplary segmented stator 200 that includes four stator segments 208. Indeed, in some embodiments, the stator does not need to be segmented at all such as the exemplary non-segmented or full round stator 300 shown in FIG. 7.

With further reference to FIGS. 1 through 5, each stator segment 108 defines a track 112. The tracks 112 are each sized to slidably receive therein a corresponding pin 116 defined by the end shield 104.

Figure 1:
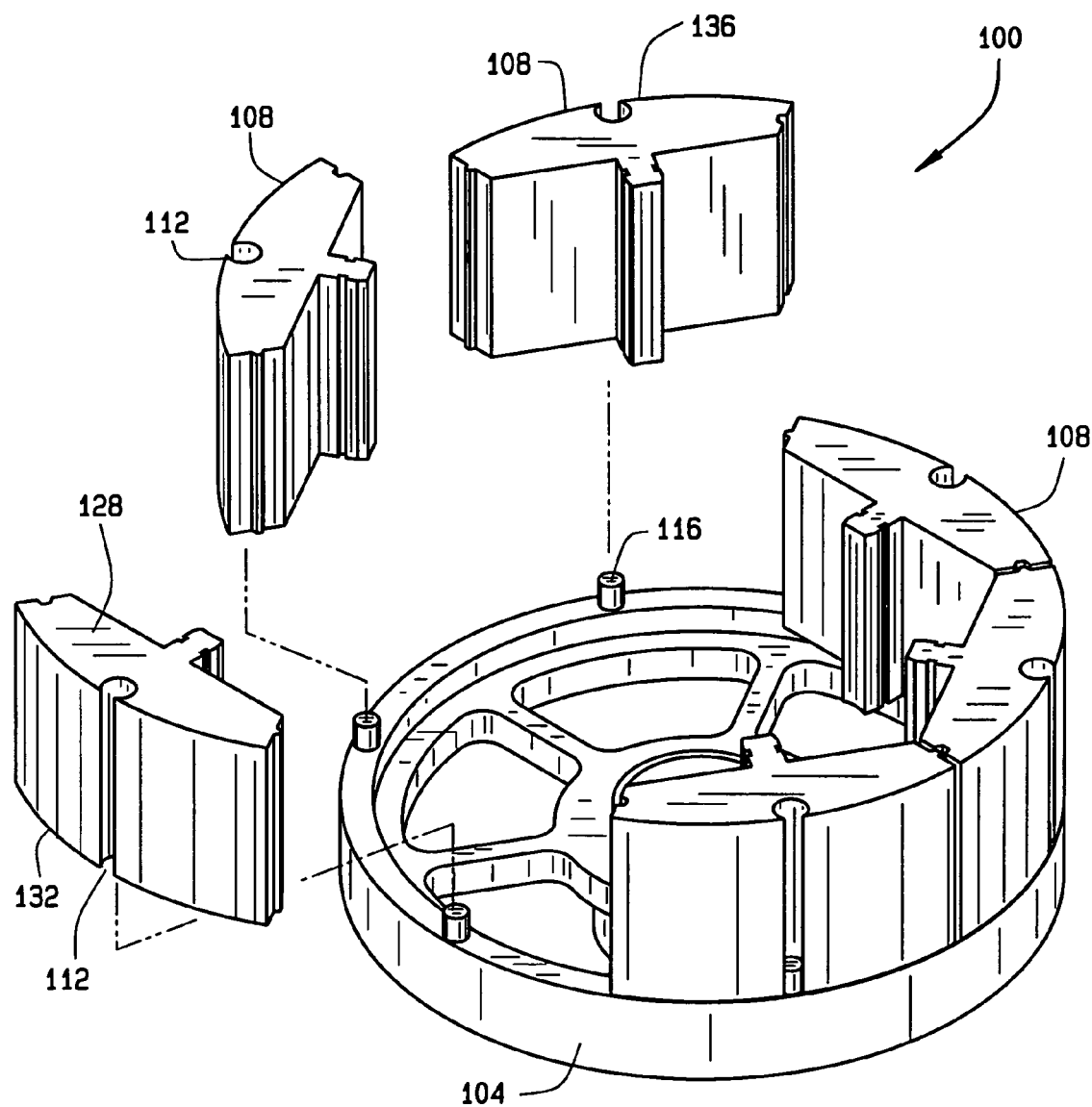
FIG. 1 is a partially exploded perspective view of an end shield and an unwound segmented stator according to one embodiment of the invention.

While FIG. 1 shows each stator segment 108 with only one track 112 and shows the end shield 104 defining only one pin 116 for each stator segment 108, such is not required. Other embodiments can include stator segments having one or more tracks depending on the particular application and arrangement of the end shield's pins. In yet other embodiments, the stator segments may each define one or more pins (instead of tracks) sized to be slidably received within tracks defined by the end shield. In still further embodiments, different combinations of pins and tracks can be defined by either or both the stator segments and the end shield depending on the particular application.

Figure 2:
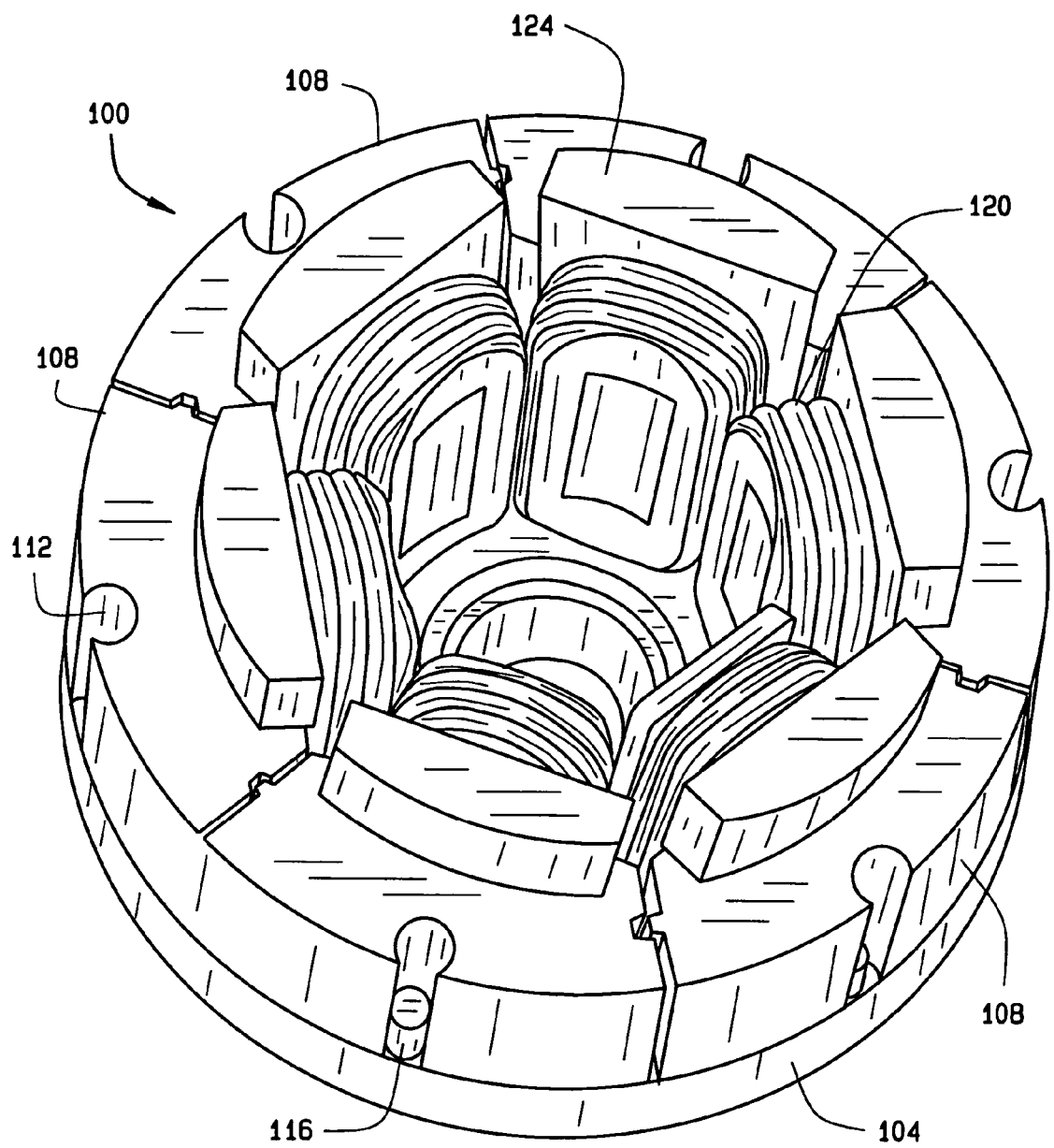
FIG. 2 is an perspective view of the segmented stator positioned on the end shield shown in FIG. 1, and also showing the stator windings and end caps coupled to the stator segments.
Figure 3:
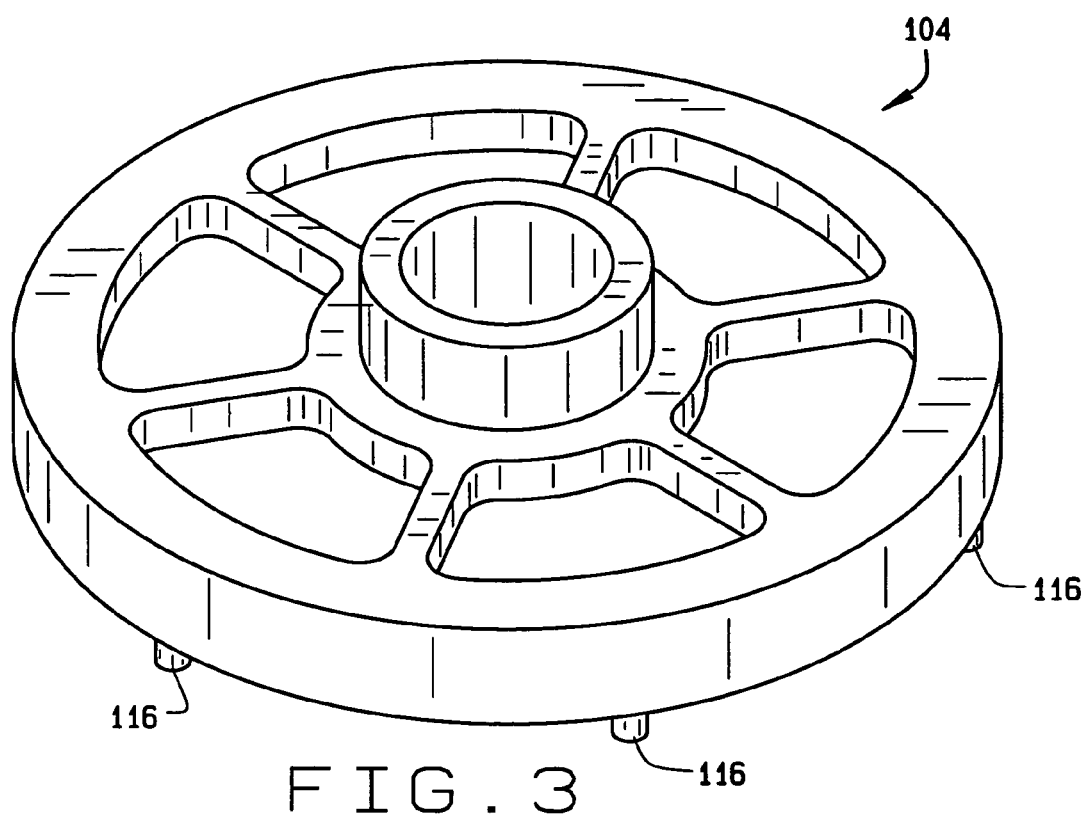
FIG. 3 is a perspective view of the end shield shown in FIG. 1.
Figure 4:
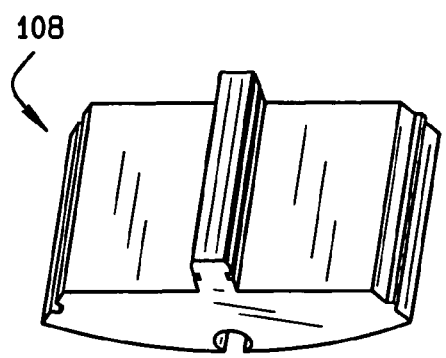
FIG. 4 is a perspective view of an unwound stator segment shown in FIG. 1.
Figure 5:
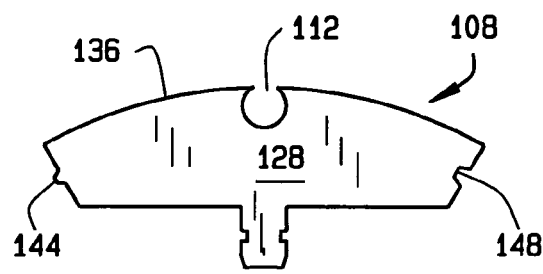
FIG. 5 is a plan view of an unwound stator segment shown in FIG. 1.

For purposes of illustration only, FIG. 2 shows the stator windings 120 and end caps 124 coupled to the stator segments 108. Aspects of the invention, however, are applicable to any suitable number, size, and type of stator windings and end caps. Accordingly, the present invention should not be limited to the particular configuration of stator windings 120 and end caps 124 shown in FIG. 2.

For clarity, FIG. 1 shows unwound stator segments 108 (without end caps 124 and windings 120) being assembled on the end shield 104. In various implementations, however, the end caps 124 and windings 120 are coupled to the stator segments 108 before the stator segments 108 are assembled on the end shield 104. The wound stator segments 108 together with the end caps 124 and windings 120 are then assembled on the end shield 104. Alternatively, other implementations can include assembling the unwound stator segments on the end shield, and then coupling the end caps and windings to the stator segments.

In the illustrated embodiment of FIG. 1, each track 112 extends along the entire length (i.e., from the first end 128 to the second end 132) of the outer side surface 136 of the corresponding stator segment 108. In this exemplary manner, the pins 116 can thus be received within the tracks 112 from either end 128 or 132. Alternative embodiment can include one or more of the stator segments 108 defining tracks that do not extend the entire length of the outer side surface 136.

Each track 112 is shown with a generally c-shaped cross section having an open side portion. Alternatively, other cross-sectional shapes can be employed for the tracks such as rectangular, triangular, ovular, full circular, combinations thereof, among others. For example, one or more stator segments can define tracks having a generally circular but closed cross section.

As shown in FIGS. 1, 2, 4 and 5, each stator segment 108 also defines a ridge 144 and a groove 148. Each stator segment 108 can be positioned on the end shield 104 between two other stator segments with the groove 148 and ridge 144 of each stator segment 108 being respectively engaged with another stator segment's ridge along one side, and one other stator segment's groove along the other side. Aspects of the invention, however, are not limited to the particular groove and ridge arrangement shown in FIGS. 1, 2, 4, and 5.

The pins 116 defined by the end shield 104 will now be described. As shown in FIGS. 1 and 2, each pin 116 includes a substantially circular cross section. Alternatively, other cross-sectional shapes can be employed for the pins depending on the particular configuration of the tracks. For example, other embodiments can include one or more pins having a non-circular cross section such as rectangular, triangular, ovular, combinations thereof, among others.

In various implementations, the end shield 104 and the pins 116 can be integrally or monolithically formed as a single component. One exemplary implementation integrally casts the end shield 104 and the pins 116 as a single component. Other suitable manufacturing processes besides casting can also be used to integrally form the end shield and the pins as a single component including molding, machining, powder metal technology, etc.

Even though the pins 116 can be formed integrally with the end shield 104, such is not required. In other embodiments, the pins may comprise discrete components that are separately engaged to the end shield, for example, by press fitting, welding, threads, among other suitable methods. In those embodiments in which one or more stator segments define pins, such pins can be separate components that are separately engaged to the stator segments.

A wide range of materials may be used for the end shield 104 and the pins 116. In those implementations in which the end shield 104 and pins 116 are integrally formed as a single component, the end shield 104 and pins 116 can be formed from the same material, such as aluminum, etc. But in embodiments in which the pins and the end shield are separate components, the pins and the end shield can instead be formed of different or dissimilar materials.

The tracks 112 and pins 116 are preferably configured so as to provide a means for at least inhibiting relative rotational movement between the stator 100 and the end shield 104. That is, the tracks 112 and pins 116 are configured (e.g., shaped, sized, formed of suitable materials, etc.) such that the engagement of the pins 116 within the tracks 112 at least inhibits rotation of the stator segments 108 relative to the end shield 104. The engagement of the pins 116 within the tracks 112 can also provide a hard stop or secondary retention feature in the event of a loss of the circumferential interference fit between the stator 100 and the housing (e.g., due to thermal expansion, etc.). In this exemplary manner, the engagement of the pins 116 within the tracks 112 can help with maintaining sensor alignment.

In addition, engaging the tracks 112 with the pins 116 can help with positioning and assembling the stator segments 108 on the end shield 104, which can be done manually, via full automation, or combinations thereof depending on the particular application. That is, the end shield 104 and pins 116 can support and control the position of the stator segments 108 while they are being assembled into the stator 100 and also during operation of the machine. And, with the pins 116 within the tracks 112, the end shield 104 effectively becomes part of the stator subassembly such that the end shield 104 can be positioned along with the stator 100 into the housing.

FIG. 6 illustrates an exemplary embodiment including a segmented stator 200 and an end shield 204. As shown in FIG. 6, the segmented stator 200 includes four stator segments 208 each defining a track 212. The end shield 204 includes four pins 216 each sized to be slidably received within one of the tracks 212.

Figure 7:
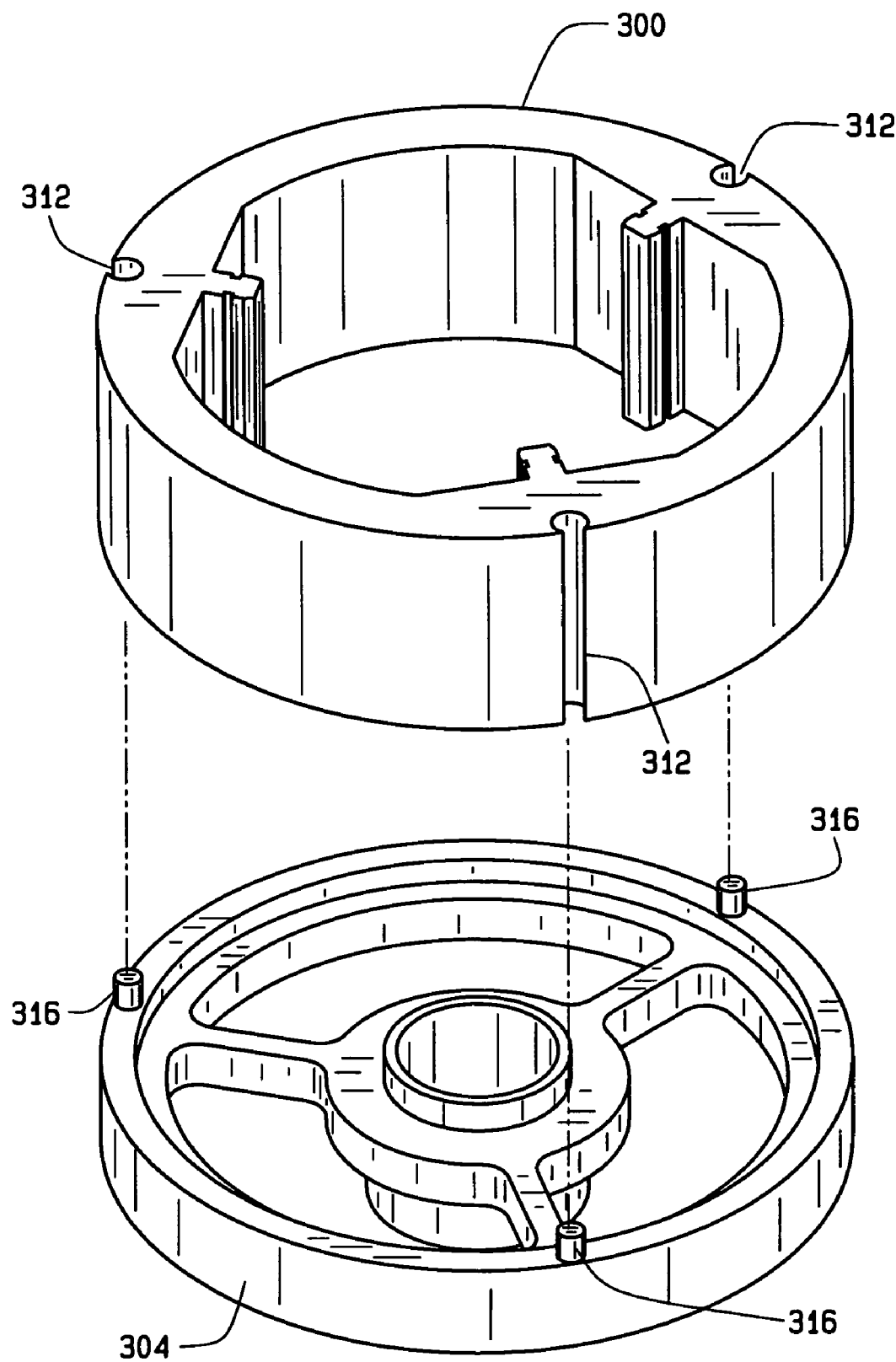
FIG. 7 is an exploded perspective view of an unwound non-segmented stator and an end shield according to another embodiment of the invention.

FIG. 7 illustrates an exemplary embodiment that includes a non-segmented or full round stator 300. As shown in FIG. 7, the stator 300 defines three tracks 312, and an end shield 304 includes three pins 316 each sized to be slidably received within one of the tracks 312.

In preferred implementations, the tracks 312 and pins 316 are configured such that the engagement therebetween at least inhibits relative rotational movement between the stator 300 and the end shield 304. In some implementations, the engagement of the pins 316 within the tracks 312 can provide secondary retention should the circumferential interference fit between the stator 300 and the housing be lost (e.g., due to thermal expansion, etc.), and thus helping to maintain sensor alignment.

In another form, the present invention provides methods of engaging a stator with an end shield of an electric machine. The stator may be a non-segmented stator or a segmented stator. In one implementation, the method generally includes positioning at least one pin defined by either the stator or the end shield within at least one track defined by the other one of the stator and the end shield. In at least one implementation, the method can further include positioning the end shield with either the non-segmented stator or the stator segments positioned thereon into the housing of the electric machine.

Accordingly, various implementations include stator segments that can be assembled directly on an end shield without the need for supplemental restraints, secondary fixtures, or retaining bands. Various implementations can also include positioning an end shield and stator (whether segmented or non-segmented) together within the housing rather than inserting the end shield into the housing as a separate component in a discrete operation. Therefore, implementing one or more aspects of the invention allows motor assembly to be streamlined by reducing the number of discrete operations required for assembling the electric machine.

Various aspects of the present invention can be used in a wide range of electric machines, electric motors, electric superchargers, switched reluctance motors, brushless permanent magnet (BPM) motors, induction motors, and electric generators. Accordingly, the specific references to electric machine herein should not be construed as limiting the scope of the present invention to only one specific form/type of electric machine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric machine comprising a segmented stator including a plurality of annularly arranged stator segments, each said stator segment positioned between two adjacent stator segments and defining at least one track, a plurality of end caps for supporting winding wire, an end shield, and a plurality of pins formed with the end shield, the stator segments being positioned on the end shield such that each said pin is received within a different one of said tracks, wherein the end shield and the pins are monolithically formed as a single component.

2. The machine of claim 1, wherein the pins and tracks are configured such that the engagement therebetween at least inhibits relative rotational movement between the stator segments and the end shield.

3. The machine of claim 2, wherein the pins are not threaded.

4. The machine of claim 3, wherein the end shield defines only one said pin for each said stator segment, and each said stator segment defines only one said track.

5. The machine of claim 4, wherein each track has opposite ends and wherein each pin extends beyond only one of said opposite ends.

6. The machine of claim 5, wherein each said track is formed along an outer side surface from a top to a bottom of the corresponding stator segment.

7. An electric supercharger comprising the machine of claim 6.

8. A vehicle comprising the electric supercharger of claim 7.

9. The machine of claim 1 wherein each stator segment is configured to receive only one end cap.

10. The machine of claim 1 wherein the tracks are substantially c-shaped.

* * * * *